United States Patent Office 3,553,816
Patented Jan. 12, 1971

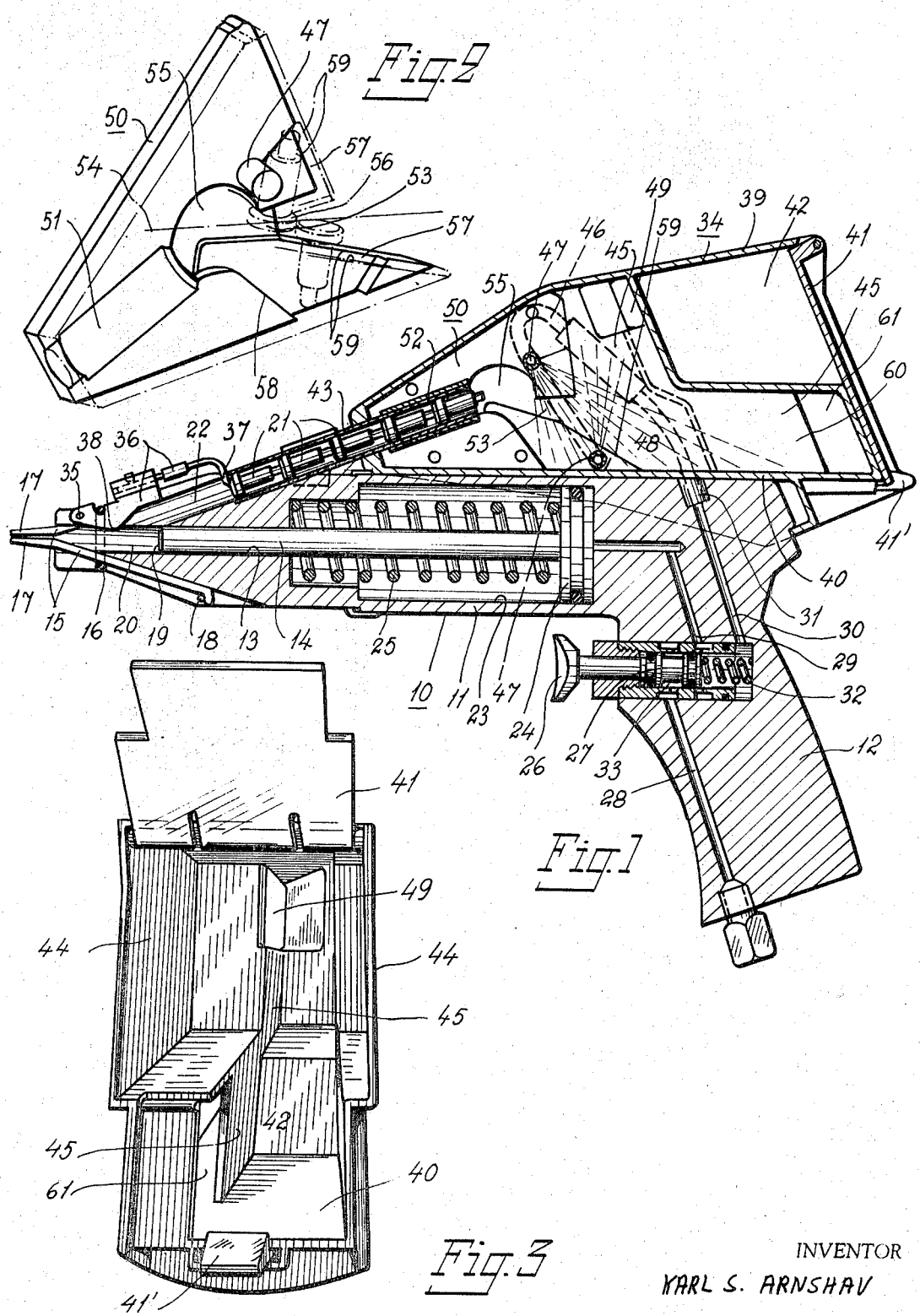

3,553,816
ARRANGEMENT IN PNEUMATIC HAND TOOLS FOR INSERTING SKID-PREVENTING STUDS INTO VEHICLE TIRES
Karl Sivert Arnshav, Stockholm, Sweden, assignor to Frank Dahlberg AB, Stockholm, Sweden
Filed Nov. 22, 1968, Ser. No. 778,239
Int. Cl. B23q 7/12
U.S. Cl. 29—212
7 Claims

ABSTRACT OF THE DISCLOSURE

There is provided an arrangement in hand guns provided with a striker means arranged for movement in the bore of the gun between a forward and a retracted position and intended to insert into tire treads skid-preventing studs of the type which present a stem portion and a head portion, and includes a magazine divided into a number of magazine chambers of which one is adapted to receive skid-preventing studs in no particular order of alignment or array, an outlet opening which communicates with one end of a stud feed line via a stud aligning device which presents a gate opening leading to the other end of the feed line and adapted to permit only those studs to pass which are presented to the gate head first and in a position in which their long axes form an angle with the centre axis of the gate opening, and wherein the magazine is provided with at least one air nozzle adapted to blow away all studs which reach the gate in a position different to that in which they can pass through said gate.

The present invention is concerned with an arrangement in pneumatic tools for inserting skid-preventing studs into previously disposed holes in tire treads, and in which each of the studs is of the type which presents at one end a headmember, the radial dimensions of which exceed its axial dimensions and also the radial dimensions of the remaining portion of the studs, the tool including a striker means which is capable of moving in a bore, between a forward and a retracted position to insert the skid-preventing tire studs head first into said holes between fingers carried by the tool and capable of being inserted into the holes and expanded therein, to widen said holes when the studs are inserted, a pneumatic drive means for driving the striker at least in the direction in which the studs are inserted, a chamber arranged in the bore in front of the striker means in its retracted position to receive studs arriving at said chamber head first, and a stud feed line, one end of which opens out into said chamber and the other end communicates with a stud magazine carried by the tool proper.

Hand guns or tools of the aforementioned type have hitherto been fitted with revolving type magazines which present a plurality of axial passages, each adapted to receive a plurality of tire studs in mutual alignment with one another. Charging of the revolving magazine has involved a tiresome and time-consuming extra working sequence, and stud insertion tools which present revolver-type magazines have consequently not achieved any great success on the market, despite the fact that in many instances, for example when tire studding is carried out on a small scale, where workshop space is restricted or where the stud is to be inserted into a tire without removing the tire from the car, such magazines are held in preference to tools operating with conventional stud magazines remote from the tool proper, which are relatively expensive, occupy a relatively large area of the workshop space and are difficult to move from one working position to another.

The object of the invention is to provide an arrangement in a magazine-carrying tool of the type defined in the introduction which removes the aforementioned disadvantages. To achieve the object of the invention it is suggested that the magazine is provided with a magazine chamber adapted to accommodate a plurality of studs stored in disarray in said magazine, and an outlet opening which communictes with said other end of the feed line via a stud aligning device, the aligning device presenting a gate opening which leads to said other end of the feed line and which will only allow the studs to pass through when presented at said gate essentially head first with their longitudinal axes forming an angle with the centre axis of the gate opening, and that the magazine is provided with at least one air nozzle adapted to emit intermittently a stream of air to chase studs from the region of said gate opening so as to remove therefrom studs which have reached said gate opening in a position different to that in which they can pass through said gate.

The invention will now be described with reference to the accompanying drawing, wherewith further characteristic features of the invention will be disclosed. In the drawing, FIG. 1 is a sectional view of a preferred embodiment of a tool provided with a magazine according to the invention, FIG. 2 is a perspective view of the aligning means in the magazine, and FIG. 3 is a perspective view of the magazine seen from the rear and showing a cover plate, which permits charging of the magazine, in open position, to illustrate the design of a first magazine chamber.

There is shown in the drawing a stud insertion tool in the form of a handgun 10, presenting a body portion 11 and a butt 12. The body 11 presents an axial bore 13 in which is displaceably mounted a striker device 14 adapted to drive a tire stud head first into the tire tread in which a number of stud accommodating holes have previously been disposed. Pivotally mounted at the front portion of the body 11 are a number of fingers 15, the free ends of which project beyond the front end of the body 11.The fingers 15 are normally held in a pivoting position, by means of a resilient ring 16, for instance made of rubber, wherein the free ends 17 of said fingers are arranged in adjacent relationship so that said ends 17 can be passed into a stud-accommodating hole in a tire. The fingers 15 can be swung about their pivot points, of which one is indicated at 18, against the action of the resilient ring 16, to a position in which the ends 17 of fingers 15 are expanded to open the hole in the tread. In the illustrative embodiment, the fingers are expanded by the action of a stud urged between the fingers by the striker means 14 into the stud-accommodating hole in the tire. In another embodiment, which is known to the art, the fingers are forced apart by cam surfaces located on the insides of the fingers and actuated by the striker means during its forward movement.

The striker 14 is arranged for movement in the bore between a retracted position, shown in FIG. 1, and a forward position in which its front end extends slightly beyond the ends 17 of fingers 15. When the striker means is retracted there is located in the bore 13 in front of the front end 19 of the striker a chamber 20 adapted to receive studs 21, which arrive at said chamber head first and which are passed thereto through a feed line 22 which passes obliquely into the chamber 20 in such a manner that the studs can pass singly into the chamber 20, in position to be driven by the striker 14 into a stud-accommodating hole in the tire tread. The striker 14 is operated by means of a pneumatic drive means, which in the illustrative embodiment includes a cylinder 23 and a piston 24 mounted for movement in the cylinder. The piston 24 is connected with the striker device 14 and is actuated on one side by a spring 25, which attempts to move said piston, and thereby also the striker 14, to the shown retracted position. The piston 24 and the striker 14 are moved to the forward position by means of compressed air, which, is supplied via line and valve means to the side of the piston 24 remote from the spring 25. The line and valve means include a slide valve 27 arranged in the butt 12 and actuated by a trigger 26. Passing to the slide valve 27 is a line 28 which is adapted to be connected to a source of pressure medium (not shown), and passing from the slide valve to one side of the piston is a line 29, while a further line 30 passes to an air outlet 31 placed on the upper side of the body 11. The slide valve 27 is normally urged by a return spring 32 to a position in which the lines 29 and 30 communicate with each other, as can be seen from FIG. 1. In this position of the slide valve 27 there is no communication between the line 28 and line 29 or 30. When the trigger 26 is depressed air is able to pass from the line 28 through the annular space 33 around the slide valve and into the line 29, and passes further to the cylinder 23 so that piston 24 and the striker 14 are moved forward, while when the trigger is released the slide valve 27, under the action of spring 32, is moved again to the left in FIG. 1, to the shown position, in which the line 29 is caused to communicate with line 30 so that air, which upon return of the piston to the shown retracted position by the action of spring 35, flows out of the cylinder 23 and is caused to pass through the lines 29 and 30 and into a magazine 34 which is detachably mounted on the tool body 11; the magazine 34 will be described in more detail below.

To prevent more than one stud 21 at a time from passing through the line 22 to the chamber 20 in the bore 13 there is provided in the vicinity of the region where the feed line 22 opens out into said chamber a blocking means in the form of an arm 36, which is pivotally mounted at 35 and the length of which can be adjusted and which, through the intermediary of an angular portion 37, extends through a longitudinally extending slot into the feed line 22, to control the passage of the aligned studs into the feed line and the chamber 20. Arranged on the underneath of the arm 36 is a cam surface 38 which is intended to be so actuated by a stud 21, being advanced by the striker 14 between the fingers 17, and by the striker itself, that the arm 36 is swung counterclockwise, as seen in FIG. 1, to such an extent that the portion 37 leaves the feed line to allow a stud 21 to pass the portion 37, so that when the striker reaches its retracted position said stud can slide into the chamber 20. The arm 36 is actuated to the shown blocking position by means of the ring 16 in a manner similar to the fingers 15, and hence the arm adopts the blocking position as soon as the striker has passed the cam surface 38, during its passage to the retracted position.

The tool, to the extent that it has been described with reference to the accompanying drawing, is essentially known per se, and the invention is not restricted to the shown and described embodiment of the tool 10. The essential structural requirements of the tool are solely that said tool presents a striker means arranged for movement between a forward position and a retracted position, for driving the tire studs head first into holes disposed in the tread of a tire, that the tire studs and the striker device pass between fingers which are capable of being inserted into the holes and which can be expanded to widen said holes when inserting the studs therein, that there is provided a pneumatic drive means for driving the striker in at least the stud-inserting direction, a chamber arranged in the bore in front of the striker in its retracted position to receive studs arriving at said chamber head first, and a stud feed line which opens out at one end into said chamber and which communicates via its other end with a stud magazine carried by the tool proper.

In accordance with the invention the magazine 34 consists of a casing which presents an upper wall 39, a lower wall 40 and an opening which can be closed by means of a member, such as a pivotally mounted flap or cover 41 capable of being latched by a latching device 41', and which permits a first magazine chamber 42 to be charged with studs in complete disarray, and a pipe 43 capable of being connected to the feed line 22 and the length of which pipe is preferably such that it can accommodate a plurality of aligned tire studs 21 and which is adapted to feed aligned studs 21 from the magazine 34. The sides of the magazine chamber 31 are defined by the side wall portions 44. Additional side wall portions are arranged, which are preferably detachable and of which the one farthest removed from the viewer is obscured in FIG. 1 and the one nearest the viewer of FIG. 1 has been omitted so that the interior of the magazine can be seen more clearly. Extending between said side wall portions in the longitudinal direction of the magazine is a longitudinally extending partition wall 45, which divides the magazine into two additional chambers, of which one contains lines and connection means 46 to lead air from the air outlet 31 to one or more air nozzles 47 in the other, 48, of the two additional chambers.

Passing from the magazine chamber 42 to the chamber 48 is an opening 49 through which tire studs stored in disarray in the chamber 42 can pass to an aligning device 50 arranged in the chamber 48. In the illustrated example, the aligning device 50 is constructed of two complementary halves arranged in inverted relationship, of which only the one remote from the viewer is shown in FIG. 1, while in FIG. 2 the half of the means 50 nearest the viewer is indicated by broken lines. Each half section of the means 50 presents an essentially semi-cylindrical recess 51 which accommodates one end portion 52 of the pipe 43, while the opposite end portion of the pipe 43 passes into the line 22 in the tool body 11. The means 50 also presents a gate opening 53 passing to the end portion 52 of pipe 43, and which will only allow studs 21 to pass therethrough essentially head first and when the long axis of the stud forms an angle with the centre axis 54 (FIG. 2) of the gate opening, as will be described in more detail below. Arranged between the gate opening 53 and the inlet opening of the end portion 52 is a portion 55 so widened that the studs passing through the gate opening 53 can be swung to a position in which their long axes lie parallel with the longitudinal axis of the pipe 43, as is shown in FIG. 1. The air nozzle or nozzles 47 is or are adapted to emit intermittently a stream of air to remove tire studs from the region of the gate opening 53 which have arrived at said gate opening in a position other than that in which they can pass through the gate opening. FIG. 1 shows two such air nozzles 47, and illustrates with dotted lines the width and direction of said air streams. FIG. 2 shows only one air nozzle 47.

During use, the tool is normally directed with the ends of fingers 17 pointed downwards, and the ends of the fingers are inserted in previously disposed holes in the tread of a tire (not shown). When the tool is held in this position, the tire studs are able to pass under the action of gravity from the magazine chamber 42 through the opening 49 to the aligning device 50 positioned in the chamber 48, and subsequent to being aligned pass head first into the pipe 43 until stopped by the blocking means 37. When the trigger 26 is pulled compressed air passes through the line 28, the annular space 33 and the line 29, to move the striker means 14 forward in the described manner, and the arm 36 is swung counter clockwise to allow an aligned stud to advance beyond the blocking means 37 into the line 22. When the trigger 26 is released, air is forced back through the line 29, by the action of spring 25 on piston 24, and via the line 30, the air outlet 31 and the line and connection means 46 to each air nozzle 47, which blows studs away from the area of the gate opening, whereby for instance a stud which has passed into the gate opening 53 stem first and the head of which cannot therefor pass through the gate opening 53, is blown away from the area of the gate opening, so that the erroneously positioned stud does not remain to block the gate opening 53. Each time a stud is driven into the tire the tool is imparted a certain recoil movement, which further facilitates the passage of the studs through the aligning means 50. The magazine 34 is left unsealed to such an extent that the air emitted by the air nozzles 47 can pass from the magazine to the surroundings.

To further facilitate alignment of the studs, the width of the magazine chamber 48 between the opening 49 and the aligning means 50 in FIG. 1 in a direction essentially perpendicular to the plane of the drawing, just slightly exceeds the radial dimension of each stud head but is less than the total axial dimension of each tire stud, whereby the tire studs arrive at the aligning means as one single layer of mutually unaligned tire studs, and alignment of the tire suds is thus facilitated.

The gate opening 53 of the aligning means presents a wider area intended for passage of the stud heads and which in a first radial direction, in FIG. 1 perpendicular to the plane of the drawing, presents a dimension which slightly exceeds the radial dimension of each tire studhead and in a second radial direction, extending essentially perpendicular to the first radial direction, presents a dimension which exceeds the axial dimensions but is less than the radial dimensions of the head. In FIG. 2 the head 56 of a tire stud 21 is located in said area of the gate opening, and passing to the area at right angles to said first radial direction, i.e. parallel to the plane of the drawing in FIG. 1, are grooves or channels 57 presenting a width which is less than the radial dimensions of each tire stud head but which exceeds the radial dimensions of the remainder of the stud. Arranged in the grooves 57 are members, namely the bottom of the groove 58 and the nozzle 47 in FIG. 2, positioned for each engagement with portions of the tire studs projecting into the grooves that they attempt to swing the tire studs 21 to a position in which the heads of the studs can pass through said area of the gate opening 53 intended to permit their passage, wherewith the grooves 57 can, to advantage, be caused to slope in such a way toward the gate opening 53 that the studs slide toward the gate opening with their heads in abutment with the upper groove edges 59 (FIG. 2) and, when approaching the gate opening, are swung into a position, as a result of the engagement between the groove bottom 58 or the like and the stem of the stud, in which the stud head can pass through the gate opening 53.

Considerable advantage is to be gained by designing the aligning means as an insert unit detachably mounted in the magazine so that when changing the type of studs, for instance when changing from the shown so-called single flange stud to a so-called double flange stud, it is only necessary to change the aligning means.

The air nozzles 47 can be directed to intermittently blow tire studs away from the area of the gate opening 53 in different directions. Thus, the lower nozzle 47 in FIG. 1 is directed to blow away tire studs toward the opening 49 between the magazine chambers 42 and 48, while the upper nozzle 47 in FIG. 1 is directed to blow the tire studs into a rear portion 60 of the chamber 48, which portion according to one embodiment of the invention may present an opening 61 which passes to the magazine chamber 42, to permit the ejected studs to pass back into said chamber 42.

The invention is not restricted to the described and illustrated embodiments, but can be modified within the scope of the following claims.

I claim:

1. An arrangement in pneumatic tools for inserting skid-preventing studs into previously disposed holes in tire treads, and in which each of the studs is of the type which presents at one end a head member, the radial dimensions of which exceed its axial dimensions and also the radial dimensions of the remaining portion of the studs, the tool including a striker means which is capable of moving in a bore, between a forward and a retracted position, to insert the skid-preventing tire studs head first into said holes between fingers carried by the tool capable of being inserted into the holes and expanded therein to widen said holes when the studs are inserted, a pneumatic drive means for driving the striker at least in the direction in which the studs are inserted, a chamber arranged in the bore in front of the striker means in its retracted position to receive studs arriving at said chamber head first, and a stud feed line, one end of which opens out into said chamber and the other end of which communicates with a stud magazine carried by the tool proper, characterized in that the magazine includes a magazine chamber adapted to accommodate a plurality of studs stored in disarray in said magazine, and an outlet opening which communicates with said other end of the feed line via a stud aligning device, the aligning device presenting a gate opening which leads to said other end of the feed line and which will only allow the studs to pass through when presented at said gate essentially head first with their longitudinal axes forming an angle with the centre axis of the gate opening, and that the magazine is provided with at least one air nozzle adapted to emit intermittently a stream of air to chase studs from the region of said gate opening so as to remove therefrom studs which have reached said gate opening in a position different to that in which they can pass through said gate.

2. An arrangement according to claim 1, characterized in that the outlet opening of said magazine chamber opens out into a second magazine chamber which is situated between the magazine chamber and the aligning means, and the one dimension of which slightly exceeds the radial dimensions of each stud head but is less than the total axial dimension of each stud, whereby the skid-preventing studs reach the aligning means as a single layer of mutually unaligned studs.

3. An arrangement according to claim 1, characterized in that the gate opening of the aligning means presents an area intended for the passage of the stud heads and which in a first radial direction has a dimension which slightly exceeds the radial dimensions of each stud head and in a second radial direction extending essentially perpendicular to said first radial direction has a dimension which exceeds the axial dimensions but is less than the radial dimensions of the head, and in that grooves pass to at least one side of said area of the gate opening essentially at right angles to said first radial direction, said grooves having a width which is less than the radial dimensions of each stud head but which exceeds the radial dimensions of the remainder of the stud, members being arranged in the groove and positioned for such engagement with portions of tire studs projecting into the grooves that they attempt to swing the tire studs to a position in which the heads of the studs can pass through said area of the gate opening.

4. An arrangement according to claim 1, characterized in that the feed line which extends between said receiving chamber in front of the retracted striker means and the aligning means is of such length that it can accommodate a plurality of aligned tire studs, and in that means are provided adjacent to the position where the feed line opens out into said chamber to allow one stud at a time to pass into said chamber at each stud inserting operation.

5. An arrangement according to claim 1, characterized in that the pneumatic drive means include line and valve means for passing compressed air to and from the same, the line and valve means being connectible to each nozzle of the aligning means to create the intermittent air stream.

6. An apparatus according to claim 1, characterized in that the aligning means is designed as an insert unit and is detachably attached to the magazine.

7. An apparatus according to claim 2, characterized in that arranged between the first mentioned magazine chamber and the second magazine chamber is a return opening which is arranged to permit entrance into the first magazine chamber of tire studs which have been blown away from the region of said gate opening.

References Cited

UNITED STATES PATENTS

| | | | |
|---|---|---|---|
| 3,348,291 | 10/1967 | Niedzwiecki | 29—212 |
| 3,367,015 | 2/1968 | Brosene | 29—212 |
| 3,488,825 | 1/1970 | Lundgren | 29—212 |

DONALD R. SCHRAN, Primary Examiner

U.S. Cl. X.R.

227—112